United States Patent [19]

Gagne

[11] Patent Number: 4,622,425

[45] Date of Patent: Nov. 11, 1986

[54] PROCESS FOR THE PREPARATION OF AQUEOUS SOLUTIONS OF LOW MOLECULAR WEIGHT POLYACRYLIC ACIDS OR THEIR SALTS

[75] Inventor: Pierre Gagne, Tassin-La-Demi-Lune, France

[73] Assignee: Rhone-Poulenc Industries, Paris, France

[21] Appl. No.: 450,137

[22] Filed: Dec. 15, 1982

Related U.S. Application Data

[63] Continuation of Ser. No. 175,582, Aug. 5, 1980, abandoned.

[30] Foreign Application Priority Data

Aug. 24, 1979 [FR] France .................................. 79 21336

[51] Int. Cl.$^4$ .......................................... C08F 120/06
[52] U.S. Cl. .................................. 562/595; 8/94.1 R; 8/115.6
[58] Field of Search ................ 562/595, 590; 526/216, 526/317.1

[56] References Cited

U.S. PATENT DOCUMENTS 2,789,099 4/1957 Rife et al. ........................... 260/29.6
3,281,391 10/1966 van der Mey et al. ............. 260/33.6

FOREIGN PATENT DOCUMENTS 1216105 12/1970 United Kingdom .
1536108 5/1977 United Kingdom .

Primary Examiner—Vivian Garner
Attorney, Agent, or Firm—Herbert F. Schwartz; James F. Haley, Jr.

[57] ABSTRACT

A process for the manufacture of low molecular weight polyacrylic acids or their salts is provided, particularly, their aqueous solutions. Acrylic acid in an aqueous solution containing a polymerization initiator is polymerized in the presence of acetic acid and/or propionic acid.

The solutions obtained have a low viscosity and are very stable on storage.

17 Claims, No Drawings

PROCESS FOR THE PREPARATION OF AQUEOUS SOLUTIONS OF LOW MOLECULAR WEIGHT POLYACRYLIC ACIDS OR THEIR SALTS

This is a continuation of application Ser. No. 175,582, filed Aug. 5, 1980, now abandoned.

BACKGROUND OF THE INVENTION

The present invention relates to the manufacture of polyacrylic acids, or their salts, having a low molecular weight. More precisely, it relates to the preparation of concentrated aqueous solutions of low molecular weight polyacrylic acids or their salts.

The preparation of polyacrylic acids by free radical polymerization of the corresponding acid has been known for a very long time and is carried out in accordance with various processes (see Kirk-Othmer, "Encyclopedia of Chemical Technology", 2nd Edition, Interscience Public Publishers 1963, Volume I, page 306).

A conventional method consists in polymerizing acrylic acid in aqueous solution or in an organic solvent medium, such as, for example, benzene. In general, the polymerisation of acrylic acid is carried out in the aqueous phase in the presence of initiators, such as hydrogen peroxide, sodium persulphate or potassium persulphate or organic peroxides, or the polymerization is initiated with a redox system composed, for example, of potassium persulphate and sodium thiosulphate.

It is convenient to carry out the polymerization, in aqueous solution, using solutions having a monomer concentration of less than 25%, because, in the case of more concentrated solutions, the polymerization is difficult to control as a result of the great heat of polymerization evolved.

A traditional method of controlling molecular weights is to introduce an agent for limiting the length of the polymer chains, and U.S. Pat. No. 2,789,099, which describes the use, for fulfilling this purpose, of a system composed of sodium hypophosphite and copper acetate, may be mentioned.

It is also possible to employ alcohols as chain-transfer agents, but the disadvantage of a process of this type is that partial esterification of the polyacrylic acid takes place, and this does not provide the desired objective.

A new process, which comprises the present invention, has now been provided which makes it possible to control the molecular weights obtained and which thus leads to the preparation of polyacrylic acids having low molecular weights and a narrow distribution of these weights.

It is accordingly, an objective of the present invention to provide a novel process for producing polyacrylic acid, or its salts, of controlled low molecular weight and a narrow molecular weight distribution.

It is also an object of the present invention to prepare polyacrylic acid containing aqueous solutions, in which the polyacrylic acid, or its salts, is of low molecular weight and narrow molecular weight distribution.

Other objects will be apparent to those skilled in the art from the present description.

GENERAL DESCRIPTION OF THE INVENTION

The invention thus relates to a process for the preparation of aqueous solutions of low molecular weight polyacrylic acids, or their salts, which comprises polymerizing acrylic acid in an aqueous solution containing a polymerization initiator and, if appropriate, in neutralizing the resulting polymers, and particularly polymerizing the acrylic acid in the presence of acetic acid and/or propionic acid.

Conducting the process of the present invention leads to the preparation of very concentrated solutions of polyacrylic acids, which can contain up to about 60% of solids. As will be obvious to those skilled in the art, the process of the invention can also be used satisfactorily for the preparation of more dilute solutions, for example solutions containing less than about 30% of solids.

In the description of the present invention, the expression "low molecular weight" is to be understood as meaning a weight-average molecular weight of less than about 20,000, for example, and the expression "polyacrylic acid salt" is to be understood as meaning an alkali metal salt, such as the lithium, sodium or potassium salt, or the ammonium salt, of the said acid. The polyacrylic acid obtained has a low weight-average molecular weight which most frequently lies between about 1,000 and 12,000 and preferably between about 2,000 and 10,000.

This result of the present invention is made possible by conducting the polymerization of acrylic acid, in aqueous solution, in accordance with the conventional methods, but using more or less dilute acetic acid and/or propionic acid as the reaction solvent.

The amount of acetic acid and/or propionic acid present during the polymerization influences the molecular weight distribution of the resulting acrylic acid polymer.

The acetic acid and/or the propionic acid can be introduced into the medium in either a dilute or concentrated form, but in an amount of from about 20 to 40%, and preferably from about 25 to 35%, of the weight of acrylic acid employed.

The polymerization of the acrylic acid is carried out in the presence of the customary initiators which are normally used for initiating polymerization. The initiator used must be water-soluble. The following may be mentioned as an illustration of initiators which can be used: hydrogen peroxide, organic peroxides, such as acetyl peroxide and benzoyl peroxide, hydroperoxides, such as tert.-butyl, ethyl and methyl hydroperoxide, and per-salts, such as, for example, sodium perborate and ammonium persulphate, sodium persulphate or potassium persulphate.

It is also possible to use any redox initiator, and more particularly, the system ammonium persulphate or alkali metal persulphate/alkali metal thiosulphate, bisulphite or metabisulphite, or the system ferrous salt/hydrogen peroxide. Preferably, the system ammonium persulphate or potassium persulphate/sodium metabisulphite is used.

In the following description of the present invention, the term "persulphate" is understood as meaning ammonium persulphate, sodium persulphate or potassium persulphate, and the term "metabisulphite" is understood as meaning sodium metabisulphite or potassium metabisulphite.

When a persulphate/metabisulphite redox system is employed, the amount of persulphate used is about 3 to 10%, expressed relative to the weight of acrylic acid used. Amounts chosen within a range of 3 to 5% are also totally suitable.

As regards the amount of metabisulphite, it depends on the amount of persulphate and is generally such that the weight ratio metabisulphite/persulphate varies from about 1.5 to 3:1 and preferably from about 1.5 to 2:1.

A glacial acrylic acid can be used as the monomer, but it is possible to use the generally commercially available solutions which contain a polymerization inhibitor because of the ease with which acrylic acid polymerizes during storage. Inhibitors such as hydroquinone, hydroquinone monomethyl ether of N,N'-diphenyl-p-phenylenediamine are introduced in small amounts and represent from about 0.01 to (at most) 0.1% of the weight of acrylic acid. The presence of these agents is not troublesome and they do not have to be removed before polymerization.

There is no disadvantage in using commercially availble solutions of acrylic acid containing small amounts of water (less than about 5% by weight) or of organic impurities (less than about 0.03% by weight), such as diacrylic acid, aldehydes, for example furfural, acrolein and acetaldehyde, and the like. An acrylic acid containing from about 96 to 100% of pure acid is generally used as the raw starting material.

The amount of acrylic acid introduced into the reaction medium depends on the final concentration of the polymer. It is chosen so that the polymer solution has a solids content of about 30 to 60% and preferably about 40 to 50%. In approximate terms, the initial concentration of the acrylic acid is essentially equal to that of the polymer obtained.

Deionized or distilled water is preferably employed as the solvent for carrying out the polymerization of the acrylic acid.

The amount of water required is not critical. It only influences the concentration of the polymer. For example, it can represent about 100 to 200%, and preferably from 120 to 130%, of the weight of acrylic acid.

The polymerization of the acrylic acid, performed under the conditions described above, is preferably carried out at between about 70° C., and the reflux temperature of the reaction medium, which is about 98° C.

As the weight-average molecular weight of the resulting polymer is lower, the higher the polymerization temperature, the polymerization is preferably carried out at a temperature between about 90° and 98° C.

It is more convenient to carry out the reaction at the reflux temperature of the mixture, which is easy to control and reproduce.

A practical embodiment of the invention, which obviously does not exclude other modified embodiments, is described below.

The deionized or distilled water and the acetic acid and/or the propionic acid are introduced into a reactor in amounts defined above. Preferably, the acetic acid and/or the propionic acid are brought into contact with the acrylic acid before the latter has been brought into contact with the polymerization initiator.

Air is removed from the reaction medium using a stream of inert gases, nitrogen or rare gases, to sweep the system and the resulting inert atmosphere is maintained throughout the polymerization.

The reaction medium is heated until the desired temperature, chosen within the zone defined above, is reached.

The acrylic acid is introduced into the reactor in stages or continuously, over a period of time of about 2 to 6 hours, thus making it possible to control the reaction temperature more easily. The monomer may or may not be introduced diluted with the acetic acid and/or the propionic acid, depending on whether all or part of the acetic acid and/or the propionic acid was introduced initially.

The polymerization initiator can be added all at once, but, in order to achieve greater effectiveness, it is preferably added in stages or continuously, in parallel with the addition of the monomer solution. In general, it is introduced in the form of a solution which, in the case of a persulphate/metabisulphite redox initiator, is an aqueous solution.

A preferred embodiment of the invention comprises initially in starting the polymerization by adding a portion of the acrylic acid and of the initiator, for example, about 5 to 10% of the total weight used. Subsequently, the remaining portions of acrylic acid and polymerization initiator are introduced in stages or continuously, over a period varying from about 2 to 6 hours.

The reaction medium is desirably stirred continuously throughout the polymerization.

After the various reactants have been added, heating is maintained for the time required to complete the polymerization. In general, this time is at least about 1 hour, but it can be much longer to no disadvantage.

The preferred conditions for carrying out the process of the invention during the preparation of polyacrylic acids are defined below.

An amount of acetic acid and/or propionic acid which represents about 25 to 35% of the weight of acrylic acid employed, and the amount of deionized or distilled water required to obtain the desired final concentration, are introduced into a reactor.

An inert gas atmosphere is provided and the reaction medium is heated to a temperature varying from about 90° to 98° C.

The first step is rapidly to introduce a portion, for example about 5 to 10%, of the acrylic acid and a portion, for example about 5 to 10%, of the redox system, the said redox system containing an amount of persulphate representing from about 3 to 5% of the weight of acrylic acid and an amount of metabisulphite equal to about 1.5 to 2 times the amount of persulphate. The remainder of the acrylic acid and of the redox system is added immediately afterwards, in parallel and continuously, over a period ranging from about 2 to 6 hours.

When the addition of the reactants is complete, heating is continued for a further period of about 1 hour.

The polymerization is carried out in a chosen reactor which is preferably made of stainless steel, enamelled steel or nickel. It must be equipped with a heating device and a cooling system capable of absorbing the heat of polymerization, which cooling system can be produced, for example, by circulating cooled water in the jacket of the reactor or with the aid of heat exchangers introduced into the reaction mixture or located outside the latter and connected by the usual devices, namely tubing and pumps. The reactor must also be fitted with the customary means for controlling the reaction (thermometer and manometer), the stirring means (anchor stirrer or propeller stirrer), the separate means for introducing the reactants (monomer and polymerization initiator) and a reflux condenser.

In accordance with the process of the invention, solutions of low molecular weight polyacrylic acids are obtained, the low molecular weights being demonstrated by measuring the viscosity of the solutions of these polymers. The viscosity is measured at a constant temperature of 20° C., using a Brookfield viscometer.

The polymer solutions obtained in accordance with the process of the invention have viscosities varying from about 100 to 350 centipoises (cps) but most frequently of between about 150 and 300 cps. There is a well-known correlation between the viscosity and the molecular weight of the polyacrylic acid.

In view of the nature of the acrylic acid polymer, which has a marked electrolytic character, it is difficult to define its molecular weight with precision. By way of reference, it is recognized that polyacrylic acid solutions containing 40% of solids and having viscosities of 150 and 300 cps, respectively correspond to polymers having weightaverage molecular weights of about 2,000 and 10,000.

The polymer solutions obtained have a solids content ranging from about 30 to 60% and preferably of between about 40 and 50%.

The percentage of solids is determined by heating a sample to constant weight in an oven at 100° C., the oven being kept under reduced pressure (a pressure of 10 to 300 mm of mercury).

The resulting solutions obtained by the process of the invention contain acetic acid and/or propionic acid and generally from about 8 to 12% of acetic acid and from about 10 to 15% of propionic acid.

The polymer solutions prepared in the presence of acetic acid have a pH of about 2.2 to 2.5. They are very easy to handle, have an excellent storage stability and do not tend to gel during their storage. This stability is demonstrated by measuring the viscosity during storage. The results obtained for a polyacrylic acid solution are recorded in the following table:

| Acid used | % of solids (by weight) | Storage period (days) | Viscosity (cps) |
|---|---|---|---|
| Acetic acid | 40.05 | 1 | 290 |
|  |  | 270 | 290 |
| Propionic acid | 39.75 | 1 | 220 |
|  |  | 90 | 220 |

After the acrylic acid polymer has been manufactured, the salt of the said acid can be prepared by neutralization to the equivalence point (pH=8.5) using a solution of a basic agent, such as sodium hydroxide, potassium hydroxide, or ammonia.

For certain uses, it can be advantageous to obtain a powder by drying the neutralized polyacrylic acid solution. Drying can be carried out, for example, in a spraying tower, the said solution being sprayed into a stream of hot air at about 180°-200° C. The product is thus collected in the form of a power which is perfectly stable on storage and very suitable for certain applications.

The solutions of low molecular weight polyacrylic acids thus obtained can be used in numerous applications, for example, as a sizing agent for textiles or paper. They can also be used as adjuvants for the dressing of skins, in association with an aluminum sulphate. Their use in the form of a powder obtained from their sodium salt is particularly suitable for this application.

In the case where the acetic acid and/or the propionic acid might be troublesome in the application envisaged, it is possible to remove these acids from the polymer solutions using the means well known to those skilled in the art, for example by adding an auxiliary substance which does not solubilize the polymer and which has a boiling point below about 100° C. and forms an azeotrope with the said acids, and then distilling the resulting azeotrope.

SPECIFIC DESCRIPTION OF THE INVENTION

In order to disclose more clearly the nature of the present invention, the following examples illustrating the invention are given. It should be understood, however, that this is done solely by way of example and is intended neither to deliniate the scope of the invention nor limit the ambit of the appended claims. In the examples which follow, and throughout the specification, the quantities of material are expressed in terms of parts by weight, unless otherwise specified.

EXAMPLE 1

8.890 kg. of 73% strength acetic acid and 10.120 kg. of distilled water were charged into a 100 liter stainless steel jacketed reactor equipped with a stirring system, a thermometer, a reflux condenser and three metering pumps.

A nitrogen atmosphere was provided and maintained throughout the reaction.

The reaction medium was heated to 90° C., and the following were then added rapidly via the metering pumps: 1.110 kg. of 100% pure acrylic acid, 0.067 kg. of ammonium persulphate dissolved in 1.670 kg. of distilled water, and 0.150 kg. of sodium metabisulphite dissolved in 1.670 kg. of distilled water.

The following amounts of materials were then introduced over a period of 4 hours and in parallel, while keeping the temperature at 90° C. and leaving the reaction medium under nitrogen: 20.50 kg. of 100% pure acrylic acid, 0.534 kg. of ammonium persulphate dissolved in 5.560 kg. of distilled water, and 1.050 kg. of sodium metabisulphite dissolved in 5.560 kg. of distilled water.

When the introduction was complete, a further 0.067 kg. of ammonium persulphate dissolved in 0.556 kg. of distilled water was added.

Heating was continued for a further 1 hour at 90° C., and the mixture was cooled to ambient temperature, that is to say 20° C.

A polyacrylic acid solution having the following characteristics was obtained:
solids: 40.05%
viscosity at 20° C.: 280 cps
polyacrylic acid content: 37.5%
acetic acid content: 11.4%
acid number: 394 mg of KOH/g.

EXAMPLE 2

In this example, the preparation of the sodium salt of polyacrylic acid is illustrated.

The polyacrylic acid solution, as obtained above, was neutralized to pH 8.5 by adding 55 kg. of a 30% strength by weight solution of sodium hydroxide.

It was dried in a spraying tower by spraying the solution into a stream of hot air at 180° C.

A very fine white powder was obtained.

Four experiments demonstrating the influence of the nature of the redox system and of the amount of acetic acid were carried out by way of comparison. They will be described as Experiments "A" through "D", below.

EXPERIMENT A

This experiment shows the influence of the amount of persulphate in the redox system on the viscosity of the solution obtained.

The reaction was carried out under the conditions described in Example 1, the only difference being that half the amount of persulphate was introduced, this representing a total amount of 1.54% of the weight of acrylic acid.

A polyacrylic acid solution having a very high viscosity of 2,000 cps was obtained.

EXPERIMENT B

The polymerization of the acrylic acid was carried out using a polymerization initiator which did not contain sodium metabisulphite.

The experiment was carried out under the operating conditions of Example 1, but no metabisulphite was introduced.

A polyacrylic acid solution having a high viscosity of 1,200 cps was obtained.

EXPERIMENT C

This experiment demonstrates the influence of the amount of acetic acid used during the polymerization of the acrylic acid.

In contrast to Example 1, 4.440 kg. of 73% strength acetic acid and 14.560 kg. of water were charged into the reactor. The acetic acid thus represented 15% of the weight of acrylic acid.

The polyacrylic acid solution obtained was turbid and heterogeneous, could not be diluted with water and was not entirely soluble in an alkaline medium.

EXPERIMENT D

In this experiment, the polymerization of the acrylic acid was carried out in the absence of acetic acid.

The results obtained are similar to those in Experiment C.

EXAMPLE 3

7.850 kg. of 100% strength propionic acid and 14.710 kg. of distilled water were charged into a 100 liter stainless steel jacketed reactor equipped with a stirring system, a thermometer, a reflux condenser and three metering pumps.

A nitrogen atmosphere was provided and maintained throughout the reaction.

The reaction medium was heated to 90° C. and the following were then added rapidly via the metering pumps: 1.040 kg. of 100% pure acrylic acid, 0.063 kg. of ammonium persulphate dissolved in 1.500 kg. of distilled water, and 0.135 kg. of sodium metabisulphite dissolved in 1.500 kg. of distilled water.

The following amounts of materials were then run in over a period of 4 hours and in parallel, while keeping the temperature at 90° C. and leaving the reaction medium under nitrogen: 18.450 kg. of 100% pure acrylic acid, 0.480 kg. of ammonium persulphate dissolved in 3.000 kg. of distilled water, and 0.945 kg. of sodium metabisulphite dissolved in 3.000 kg. of distilled water.

When the introduction was complete, a further 0.063 kg. of ammonium persulphate dissolved in 0.500 kg. of distilled water was added.

Heating was continued for a further 1 hour at 90° C., and the mixture was cooled to ambient temperature, that is to say 20° C.

A polyacrylic acid solution having the following characteristics was obtained:
solids: 39.75%
viscosity at 20° C.: 220 cps
polyacrylic acid content: 36.6%
propionic acid content: 14.7%
acid number: 396 mg. of KOH/g The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for the preparation of low molecular weight polyacrylic acids, which comprises polymerizing acrylic acid in an aqueous solution containing a polymerization initiator and also in the presence of acetic acid and/or propionic acid, wherein the amount of acetic acid and/or propionic acid represents from about 20% to 40% of the weight of acrylic acid to produce an aqueous solution of polyacrylic acids having a weight average molecular weight of less than about 20,000.

2. A process according to claim 1, wherein the resulting polyacrylic acid is neutralized.

3. A process according to claim 1, wherein the polymerization initiator is a member selected from the class consisting of hydrogen peroxide, an organic peroxide, a hydroperoxide, a per-salt and a redox system.

4. A process according to claim 1, wherein the polymerization initiator is a member selected from the class consisting of an ammonium persulphate and an alkali metal persulphate/alkali metal metabisulphite redox system.

5. A process according to claim 4, wherein the polymerization initiator is the redox system of ammonium persulphate or potassium persulphate with sodium metabisulphite.

6. A process according to claim 1, wherein the amount of acetic acid and/or propionic acid represents from about 25 to 35% of the weight of acrylic acid.

7. A process according to claim 4, wherein the amount of persulphate in the persulphate/metabisulphite redox system represents from about 3 to 10% of the weight of acrylic acid, and wherein the amount of metabisulphite is such that the weight ratio metabisulphite/persulphate varies from about 1.5 to 3:1.

8. A process according to claim 7, wherein the amount of persulphate in the persulphate/metabisulphite redox system represents from about 3 to 5% of the weight of acrylic acid, and wherein the amount of metabisulphite is such that the weight ratio metabisulphite/persulphate varies from about 1.5 to 2:1.

9. A process according to claim 1, wherein the amount of acrylic acid used is such that the resulting polymer solution contains from about 30 to 60% of solids.

10. A process according to claim 9, wherein the amount of acrylic acid used is such that the resulting polymer solution contains from about 40 to 50% of solids.

11. A process according to claim 1, wherein the acetic acid and/or the propionic acid are brought into contact with the acrylic acid before the latter has been brought into contact with the polymerization initiator.

12. A process according to claim 1, wherein the reaction temperature is between about 70° and 98° C.

13. A process according to claim 12, wherein the reaction temperature is between about 90° and 98° C.

14. A process according to claim 1, wherein deionized or distilled water and the acetic acid and/or the propionic acid are introduced into the reactor, kept under an inert atmosphere, the reaction medium is heated to the desired temperature, the acrylic acid and the polymerization initiator are charged into the reactor in parallel in a continuous manner, over a period ranging from about 2 to 6 hours, and the heating is maintained for a period of at least about 1 hour.

15. A process according to claim 14, wherein a portion of from about 5 to 10%, of the acrylic acid and a portion of from about 5 to 10%, of the polymerization initiator are charged into the reactor, and the remaining portions of acrylic acid and polymerization initiator are then introduced in parallel and continuously, over a period ranging from about 2 to 6 hours.

16. A process according to claim 1, wherein the aqueous solution of polyacrylic acid produced is then neutralized using a basic solution, and in that the resulting solution is dried in order to obtain a powder.

17. An aqueous solution of low molecular weight polyacrylic acids, having a weight average molecular weight of less than about 20,000 and being produced in accordance with the process of any one of claims 1 or 3.

* * * * *